United States Patent
Braught

(10) Patent No.: US 9,540,263 B2
(45) Date of Patent: Jan. 10, 2017

(54) APPARATUS FOR CREATING A VORTEX SYSTEM THAT INTENSIFIES THE MULTIPLE VIBRATIONAL MAGNETIC HIGH FREQUENCY FIELDS

(71) Applicant: Lynell Braught, White Sulfur Springs, WV (US)

(72) Inventor: Lynell Braught, White Sulfur Springs, WV (US)

(*) Notice: Subject to any disclaimer, the term of this patent is extended or adjusted under 35 U.S.C. 154(b) by 0 days.

(21) Appl. No.: 14/938,247

(22) Filed: Nov. 11, 2015

(65) Prior Publication Data
US 2016/0060142 A1    Mar. 3, 2016

Related U.S. Application Data

(63) Continuation-in-part of application No. 13/272,401, filed on Oct. 13, 2011, now Pat. No. 9,212,072.

(51) Int. Cl.
*C02F 1/48*    (2006.01)
*C02F 1/50*    (2006.01)

(52) U.S. Cl.
CPC .......... *C02F 1/485* (2013.01); *C02F 1/505* (2013.01); *C02F 2201/483* (2013.01); *C02F 2303/04* (2013.01); *C02F 2303/22* (2013.01)

(58) Field of Classification Search
CPC ...................................... C02F 1/485
See application file for complete search history.

(56) References Cited

U.S. PATENT DOCUMENTS

| | | | | |
|---|---|---|---|---|
| 6,292,085 B1* | 9/2001 | Cho | .......... | C02F 1/48 210/222 |
| 6,727,293 B2* | 4/2004 | Rader | .......... | C08J 9/02 521/135 |
| 2005/0161379 A1* | 7/2005 | Tsuboi | .......... | C02F 1/485 210/138 |
| 2005/0161405 A1* | 7/2005 | Holland | .......... | C02F 1/485 210/695 |
| 2009/0242407 A1* | 10/2009 | Shiga | .......... | C02F 1/48 204/557 |
| 2012/0038441 A1* | 2/2012 | Wilson | .......... | A61N 2/02 335/296 |

FOREIGN PATENT DOCUMENTS

WO    WO 2010114788 A1 * 10/2010 ............... A61N 2/02

* cited by examiner

*Primary Examiner* — Bryan D. Ripa

(57) ABSTRACT

An apparatus of creating multi-vibrational, frequency-based, electromagnetic fields, which are independent but may work simultaneously can be used in many applications, especially in industrial applications such as cooling towers and related pipes and plumbing. The apparatus eliminates calcium based hard water deposits and prohibits bacteria build-up in cooling towers. The apparatus also helps reduce soap usage in industrial laundry, reduce salt usage in water softeners, reduce chemical use in pools, inhibit algae growth and increase water clarity. The apparatus restructures calcium carbonate and other mineral deposits to prevent mineral buildup. The apparatus may be formed from a plurality of coil assemblies staggered within a circular pipe or undulated within a flat plate and connected to a power supply. The plurality of coil assemblies may be encased in flexible epoxy coating. As a result of the apparatus, waste water is reduced, water costs is kept low, and water is conserved.

8 Claims, 20 Drawing Sheets

APPARATUS FOR CREATING A VORTEX SYSTEM THAT INTENSIFIES THE MULTIPLE VIBRATIONAL MAGNETIC HIGH FREQUENCY FIELDS

The current application is a continuation-in-part (CIP) application of the U.S. non-provisional application Ser. No. 13/272,401 filed on Oct. 13, 2011, now U.S. Pat. No. 9,212,072.

FIELD OF THE INVENTION

The present invention relates generally to an apparatus that is a high performance, economical treatment created for industrial uses, especially, but not limited to, cooling towers, steam heaters, boilers, waste water treatment and water purification. Environmental requirements and mandates are changing and becoming extremely stringent. The present invention allows for affordable compliance. The present invention offers a unique design that creates a high performance, staggered rod construction, based on a naturally occurring vortex system that intensifies the multiple vibrational and magnetic high frequency fields that may/can change the molecular structure of liquids, in particular water.

BACKGROUND OF THE INVENTION

While testing reactions related to Patent Pending Title: FUEL ADDITIVE APPARATUS, SYSTEM AND METHOD (US patent publication 20100236938A1) a coated copper wire was wrapped in a coil configuration on a steel rod. This coated copper wire wrapped around the steel rod in the coil configuration was used to create a magnetic field for the use of helping to separate water molecules using electrolysis. A significant increase in the amount of gas produced was noted. This discovery led to continued research, testing, and development and design of the industrial apparatus for cooling towers, steam heaters, boilers, waste water treatment and water purification.

Magnetic fields have been used in various applications, such as removal of scale buildup within a liquid environment with limited success. The use of magnetic fields in industrial cooling towers, steam heaters, boilers, waste water treatment and water purification has had a very low success rate. A conventional electromagnetic water treatment apparatus may include an electro-magnetic field to prevent the occurrence and attachment of scale and rust along a pipe or channel used for the circulation of water or liquids. The presently available electromagnetic water treatment devices are designed so that a pair of permanent magnets and/or a pair of electrodes, composed of different metals, are attached to a casing, either affecting only the center of the magnetic field or using only one or two crosscuts of magnetism to affect the water. The entire device is normally included as part of the water passage or channel. According to the principle incorporated into these conventional devices, there may be a magnetic field generated by permanent magnets and/or an electric field generated by a weak electrical current. These devices containing permanent magnets and/or electrical fields generated by a weak electrical current may create an electrical and/or magnetic field that can applied to water flowing through the water passage or channel which is defined by the casing and the permanent magnets and/or electrical fields.

As can be seen, there is an extreme need for an apparatus to generate a frequency based electromagnetic field that may be used in various applications, including industrial applications such as cooling towers, boilers, waste water treatment plants, water purification and the like. Environmental mandates are changing and this new technology allows for affordable compliance.

SUMMARY OF THE INVENTION

In one aspect of the present invention, an apparatus comprises of a single or group of standard electromagnet magnetic coil assemblies made up of coated magnetic wire wrap wrapped around at least one rod. The rod may vary in diameter, which is determined by the magnetic field and frequency that is needed for the desired application. The number of wire layers of each coil assembly must be a minimum but not limited to two. The number of wire layers is determined by the magnetic field depth and frequency needed. The number of the at least one rod may be determined by the number of magnetic field that is needed to achieve the desired results. The wire wrap is a continual smooth flow on the at least one rod with the next layer of wire wrap being wound the opposite direction and any additional wire wrap is wound in the same end to end fashion with the additional layers of wire wrap being placed in a reverse direction of the previously coiled layer.

The bottom wire end of the first coil assembly is electrically connected to a positive line of the DC power supply; The top wire end of the first coil assembly must be electrically connected to the bottom wire end of the at least one intermediate coil assembly while the top wire end of the at least one intermediate coil assembly is electrically connected to the bottom wire end of the last coil assembly. The top wire end of the last coil assembly must be electrically connected to a negative line of the DC power supply. Staggering or undulating the at least one rod creates a vortex effect, which causes the field to crosscut the water many more times than the standard magnetic fields increasing the frequency and magnetic field. The staggering or undulating of the at least one rod increases the number of times the frequency and the magnetic fields crosscuts and reacts with the flowing liquid. This innovative process causes a greater reaction within the flowing liquid that is being treated. The innovative features, aspects and advantages of the present invention becomes better understood with reference to the following drawings, descriptions and claims.

DETAIL DESCRIPTIONS OF THE INVENTION

All illustrations of the drawings are for the purpose of describing selected versions of the present invention and are not intended to limit the scope of the present invention.

The following detailed description is the most accurate and concise representation of the modes of achieving the exemplary embodiments of the invention. The description is not to be taken in a limiting sense, but is made for the purpose of illustrating the general principles of the invention, since the scope of the invention is best defined by the appended claims. Various innovative features are described below that can each be used independently or simultaneously or in conjunction with each other or in combination with other features.

Broadly, an embodiment of the present invention provides an apparatus that may deliver electrical and magnetic fields, working independently or simultaneously or in conjunction with each other or in combination with other features. The electrical and magnetic fields may be used in many industrial applications, including, but not limited to the use of reducing the amount of water used in cooling towers. The present invention also may help to eliminating calcium and other mineral buildup, reducing bacteria and algae build-up in cooling towers, boilers, wastewater treatment plants, water purification, and various industrial uses. In commercial and residential use the present invention may reduce calcium and mineral buildup in pipes, reduce soap usage in laundry, reduce salt usage in water softeners, and reduce chlorine use in pools. The present invention may inhibit algae growth, while increasing water clarity by restructuring or inhibiting molecular groupings, calcium salts and other minerals. The present invention used with water may cause a change in the grouping or structuring of the water molecules, and thereby altering the surface tension of the water which may alter boiling and/or freezing temperatures. This restructuring may cause a difference when the water is used in relation to electrolysis.

Figure 2:
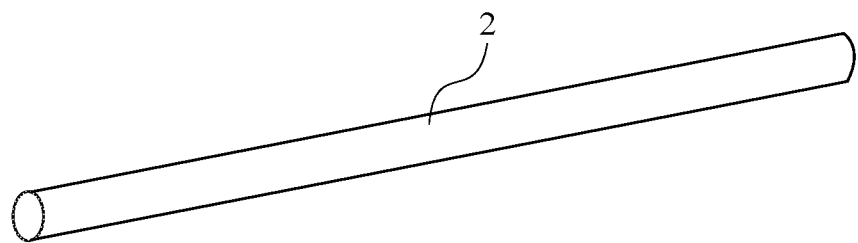
FIG. 2 is a side view of the at least one rod of the present invention.
Figure 3:
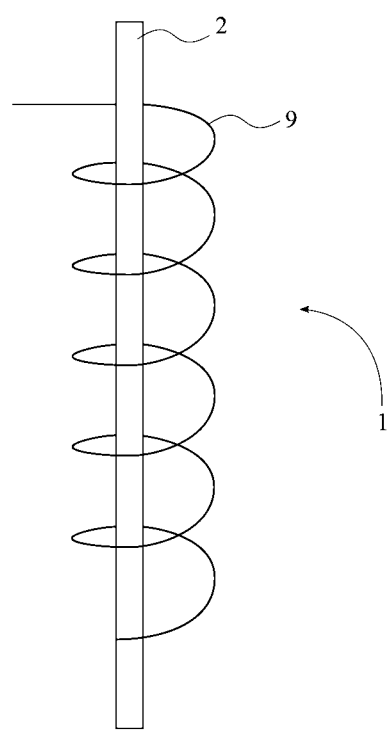
FIG. 3 is a side view of the at least one rod of FIG. 2 wrapped with one layer of wire wrap within the present invention.

In an exemplary embodiment which is shown in FIG. 1, FIG. 6, FIG. 16, and FIG. 17, the present invention comprise a plurality of coil assemblies 1, a Direct Current (DC) power supply 22, a flexible epoxy coating 25, and a housing 26. In reference to the general configuration of the present invention, the plurality of coil assemblies 1 is covered/enveloped with the flexible epoxy coating 25 and electrically connected with the DC power supply 22. The plurality of coil assemblies 1 is generally positioned or encased within the housing 26, which can be a circular pipe 27 or a flat plate 28. Each of the plurality of coil assemblies 1 comprises at least one rod 2 and a wire wrap 9. In reference to FIG. 1-3, the wire wrap 9 is coiled around the at least one rod 2 so that each coil assembly 1 can be created within the present invention. More specifically, the wire wrap 9 should coil from the top end 3 of the at least one rod 2 leaving a small amount, approximately ¼ inch exposed or extended on either end, to define a top wire end 17 and a bottom wire end 18 of the wire wrap 9. Depending upon alternative embodiments of the present invention, the at least one rod 2, the wire wrap 9, or the plurality of coil assemblies 1 may be covered with a crystal coating 5. Additionally, the wire wrap 9 is covered with a non-conductive coating so that each of the plurality of coil assembly 1 is able to create a magnetic field without creating a short circuit within the present invention.

When a circular pipe 27 is considered as the housing 26 that the plurality of coil assemblies 1 is positioned within, the plurality of coil assemblies 1 is staggered in a progressive forward direction while progressing around the diameter of the circular pipe 27 enabling the frequency and magnetic field to cause a vortexing electromagnetic frequency field to react with any liquid substance inside or outside the circular pipe 27 a multiple of times. The circular pipe 27 configuration of the present invention is shown within FIG. 16. When a flat plate 28 is considered as the housing 26 that the plurality of coil assemblies 1 is positioned within, the plurality of coil assemblies 1 is undulated in a progressive forward direction to cause a vortexing electromagnetic frequency field to react with any liquid substance outside the flat plate 28 a multiple of times. The flat plate 28 configuration of the present invention is shown within FIG. 17. The magnetic field must be significantly strong enough to overlap within the center of the circular pipe 27 or the flat plate 28. The frequency and magnetic fields can be amplified by using the crystal coating 5 that contains natural or synthetic crystals of various sizes. The depth of the overlapping of the magnetic fields help to determine the intensity of the reaction within the liquid flowing through the circular pipe 27, the liquid flowing external to the circular pipe 27, and the liquid flowing external to the flat plate 28. The strength of the frequency is determined but not totally dependent upon the electrical flow and magnetic field.

The magnetic field and electrical flow may be reversed depending upon the particular application. The magnetic field begins, but is not limited to, an industrial standard of a south pole field 16 of a first coil assembly 19 of the plurality of coil assemblies 1 progressing forward to a north pole field 15 of the first coil assembly 19 then continually and respectively moving forward to the next south pole field 16 and next north pole field 15 of at least one intermediate coil assembly 20 of the plurality of coil assemblies 1. The magnetic field is continuing progressed in a similar manner with the direction of fluid flow until a last coil assembly 21 of the plurality of coil assemblies 1. The magnetic fields are not limited to a specific number. This is determined by the size of the circular pipe 27 or the flat plate 28 and the fluid flowing around the circular pipe 27 or the flat plate 28.

Figure 4:
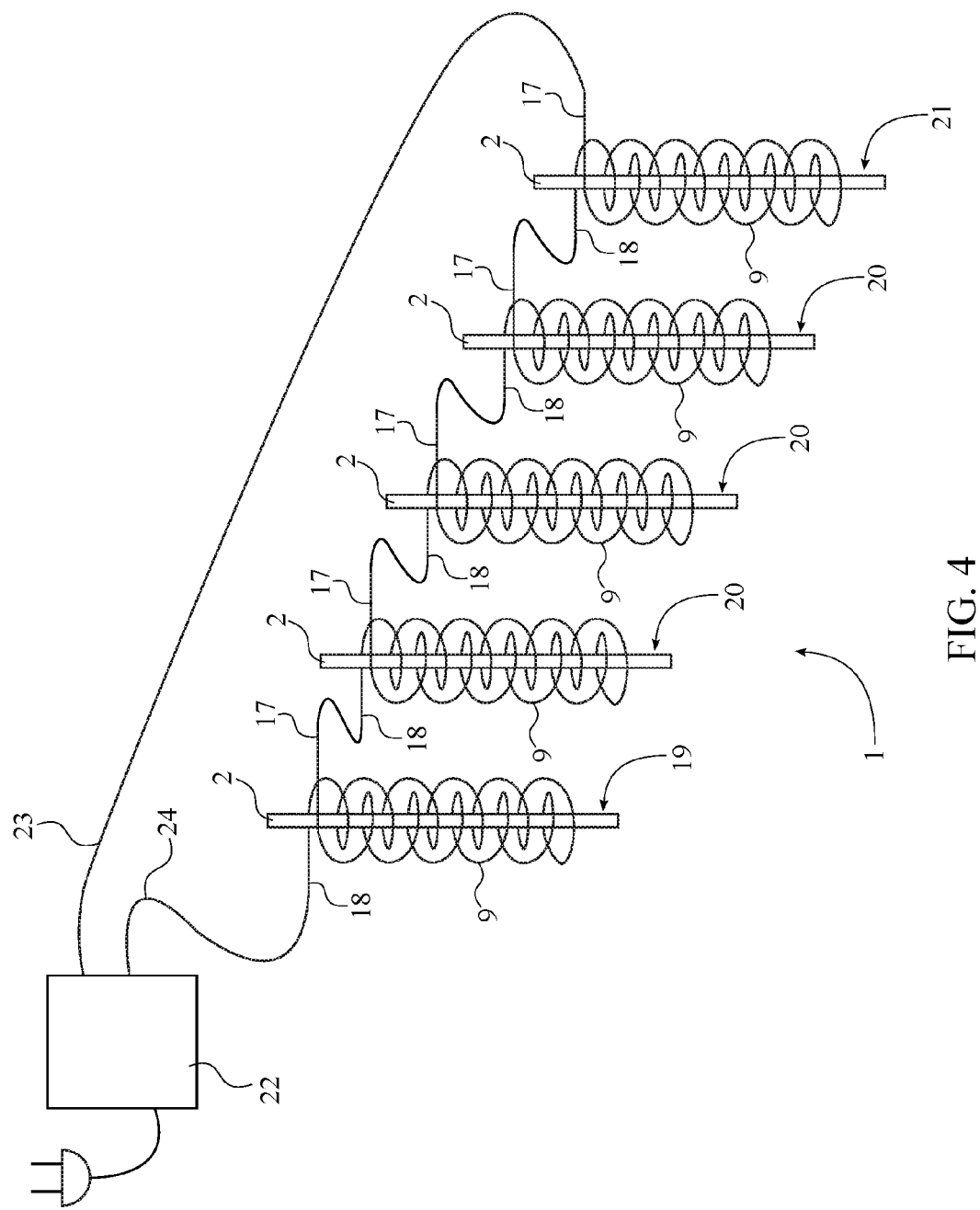
FIG. 4 is a perspective view of the plurality coil assemblies of FIG. 1, connected in a staggered series within the present invention.

In reference to FIG. 4, the bottom wire end 18 of the first coil assembly 19 is electrically connected to a positive line 24 of the DC power supply 22 as the DC power supply 22 converts an alternating higher current to a direct current. The alternative higher current to be converted may include, but not limited to, 120 volts, 240 volts, 440 volts, and 50 or 60 cycle. The top wire end 17 of the first coil assembly 19 must be electrically connected to the bottom wire end 18 of the at least one intermediate coil assembly 20 while the top wire end 17 of the at least one intermediate coil assembly 20 is electrically connected to the bottom wire end 18 of the last coil assembly 21. The top wire end 17 of the last coil assembly 21 must be electrically connected to a negative line 23 of the DC power supply 22. The at least one rod 2 should be wrapped by the wire wrap 9 following the same design but does not need to be limited to the same number of wire wrap 9.

Figure 5:
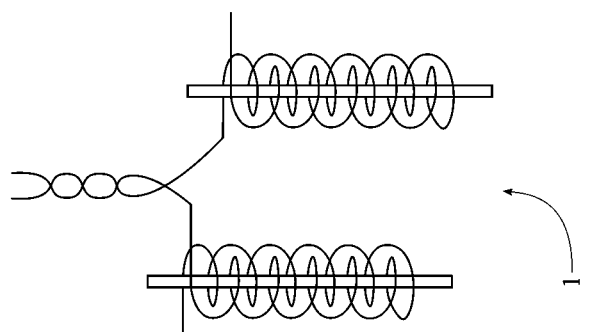
FIG. 5 is a close-up view of the connection between the plurality coil assemblies within the present invention.
Figure 6:
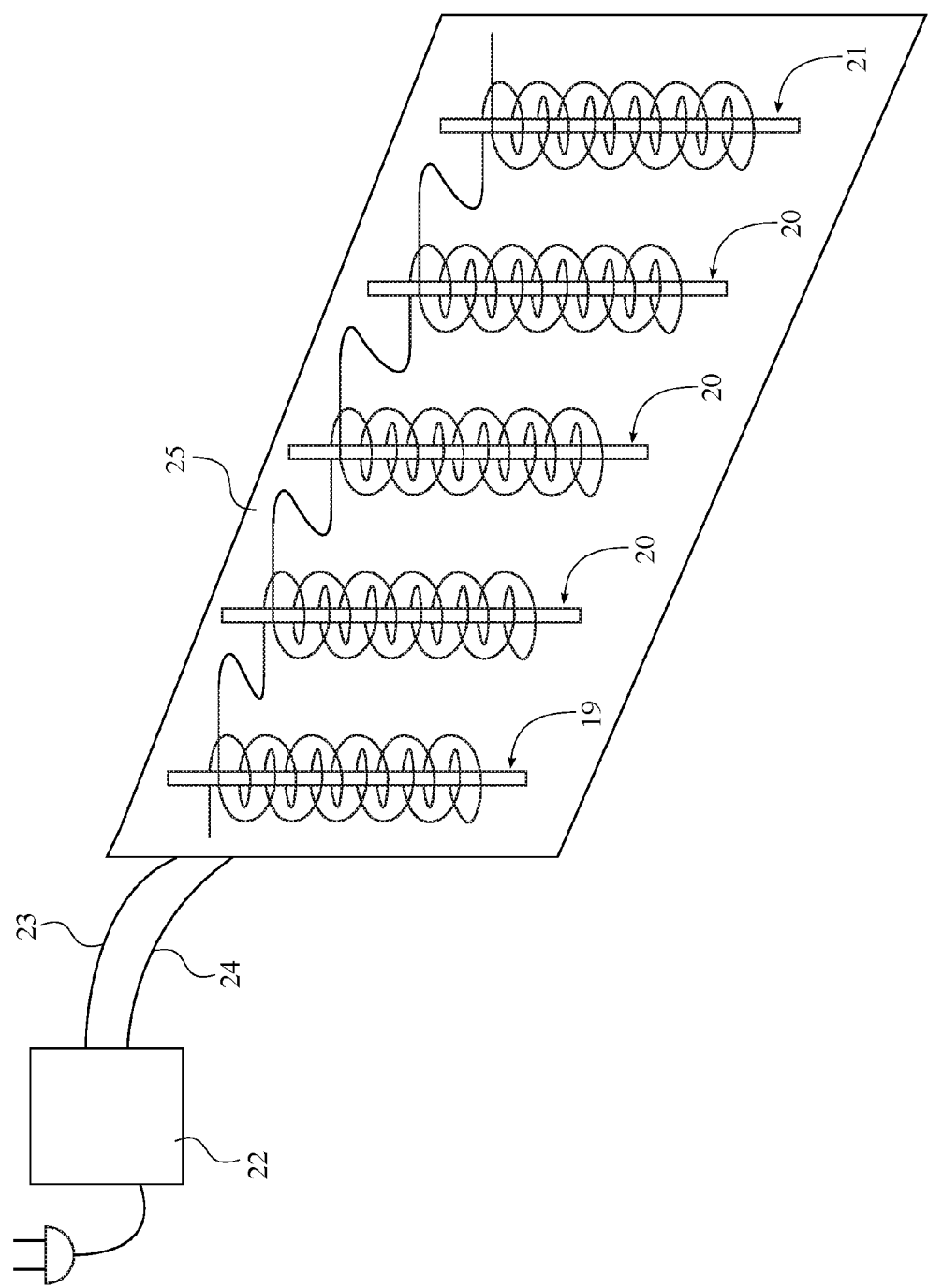
FIG. 6 is a perspective view of the plurality of coil assemblies showing the flexible epoxy coating within the present invention.
Figure 7:
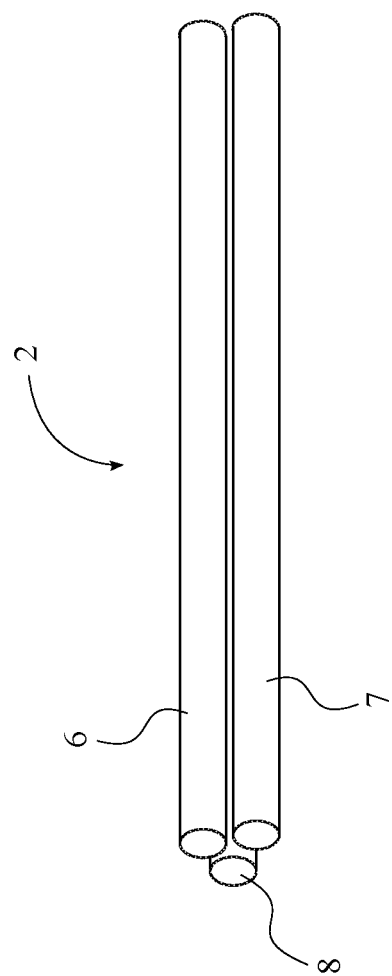
FIG. 7 is a view of three rods of the at least one rod stacked together without the wire wrap within the present invention.
Figure 8:
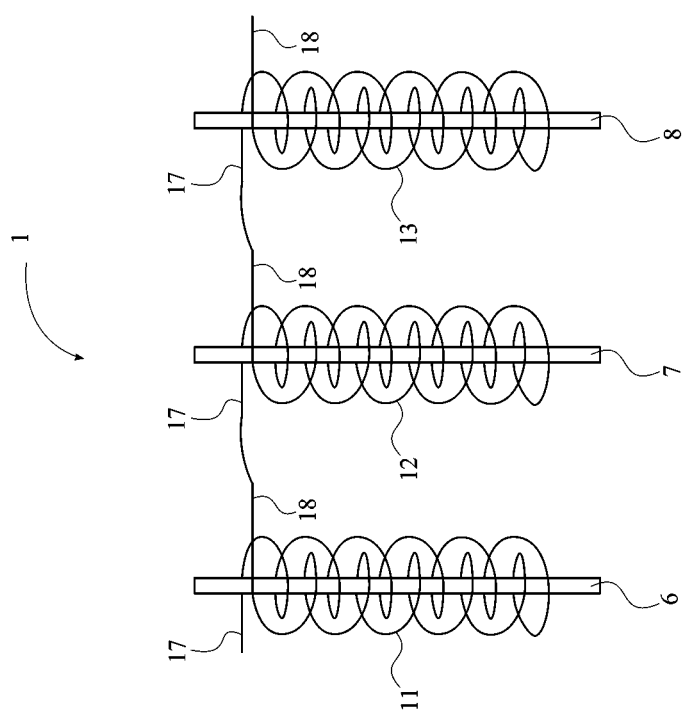
FIG. 8 is a view of three rods stacked together with the wire wrap wrapped around the three inner rods in series connection within the present invention.
Figure 9:
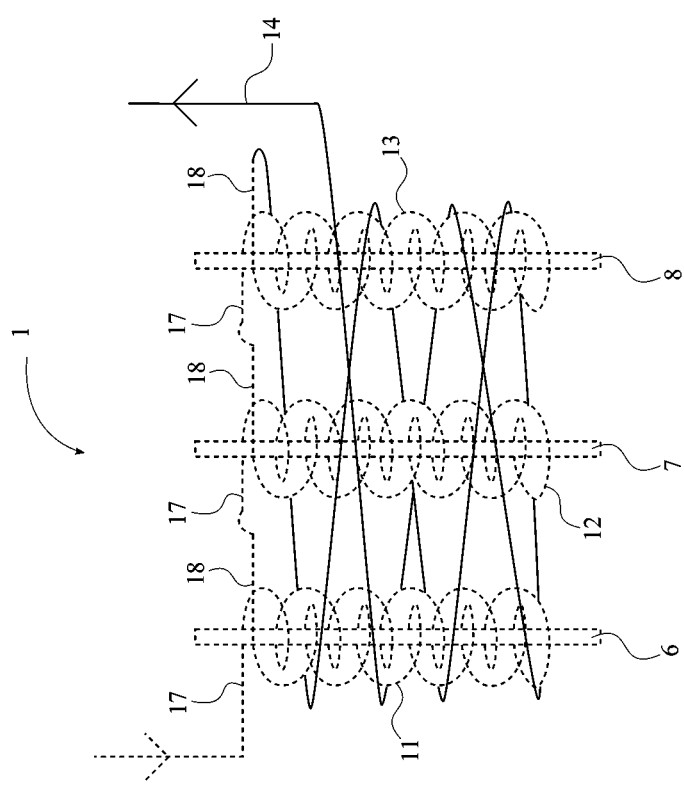
FIG. 9 is a view of three uncoated rods stacked together with the wire wrap wrapped around the three inner rods and the final wire section that is wrapped around the three inner coils holding them all together as one unit in series connection within the present invention.
Figure 10:
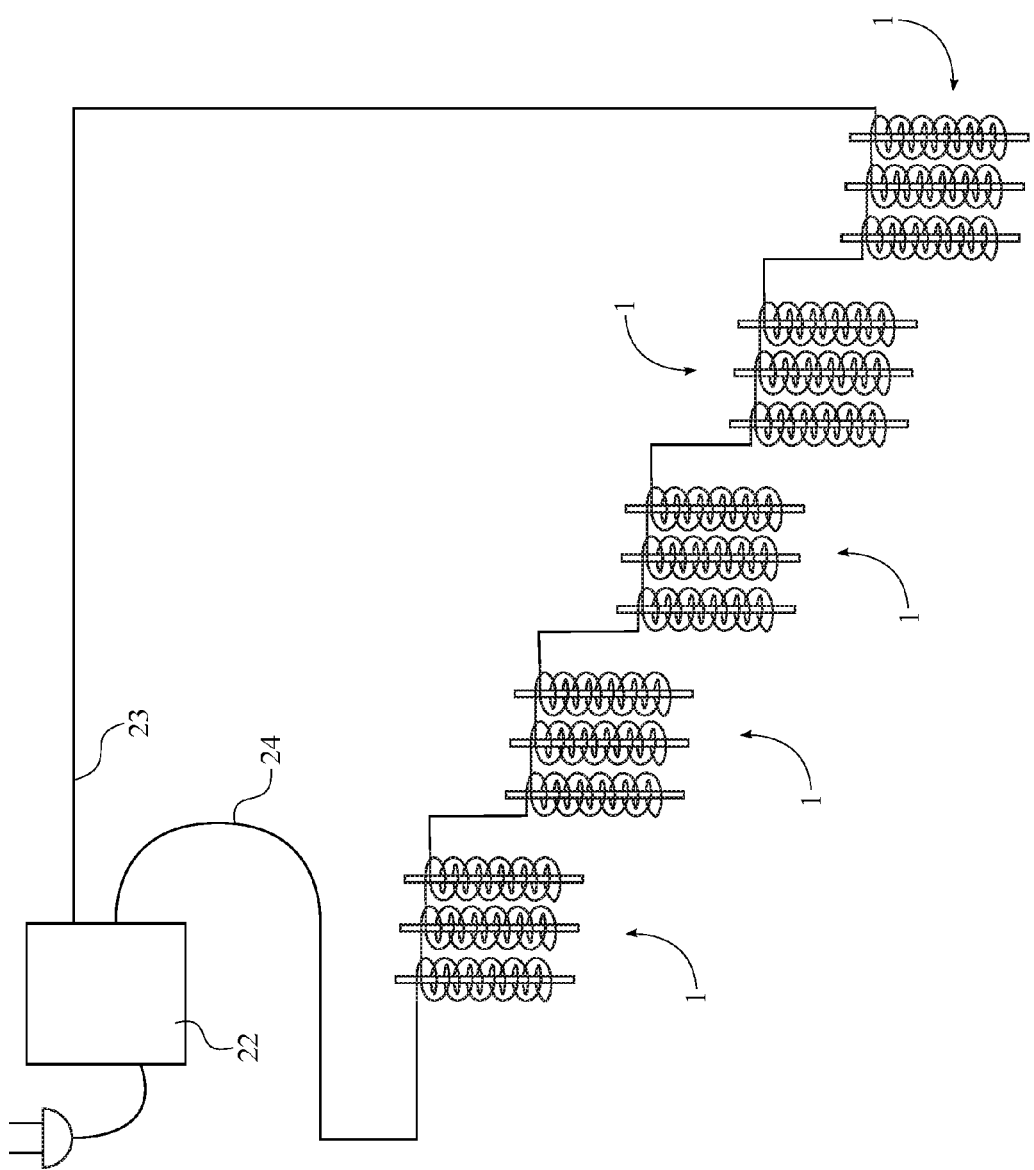
FIG. 10 is a perspective view of a plurality of staggered coil assemblies in series connection within the present invention.
Figure 11:
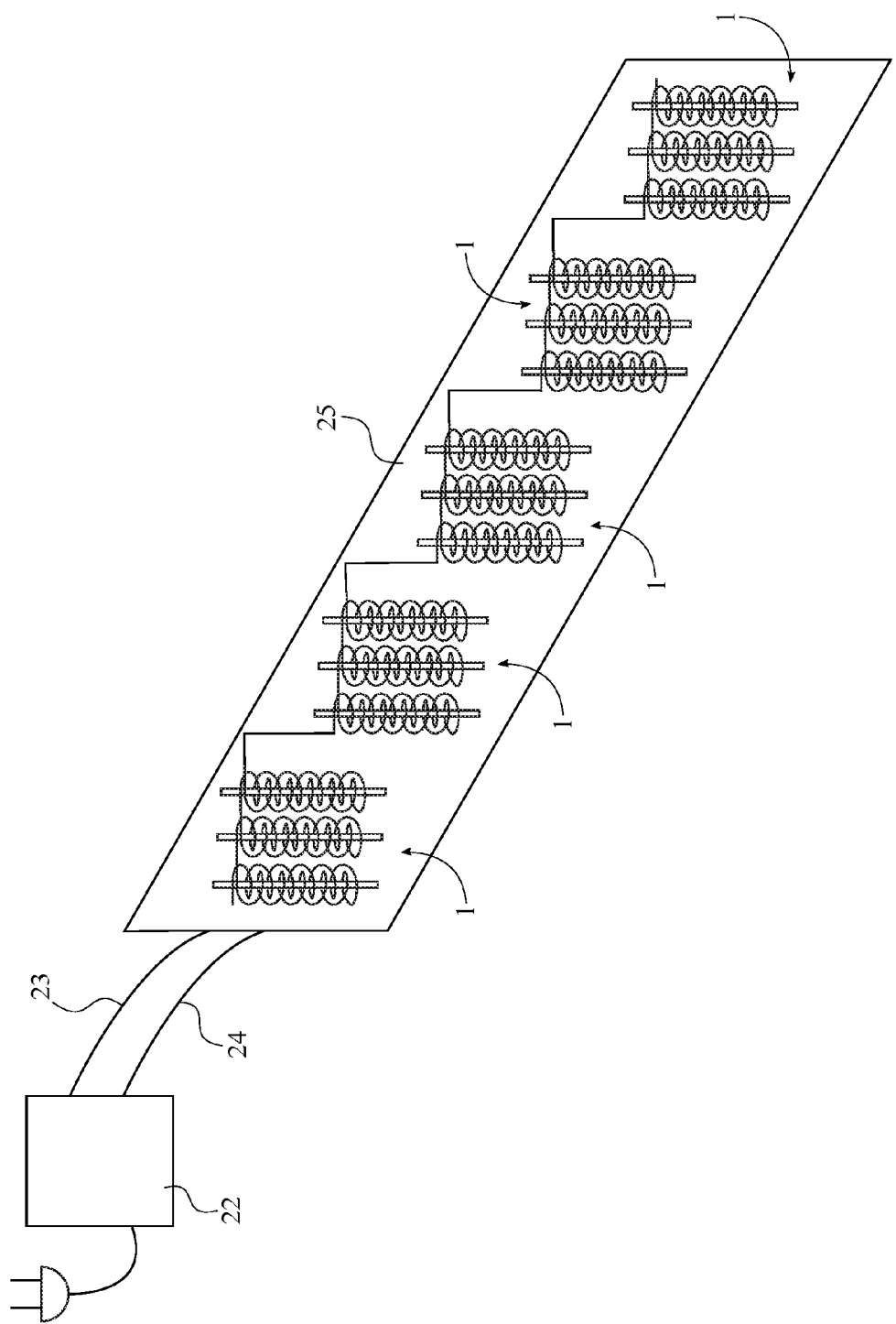
FIG. 11 is a perspective view of a plurality of staggered coil assemblies in series connection and the flexible epoxy coating within the present invention.
Figure 12:
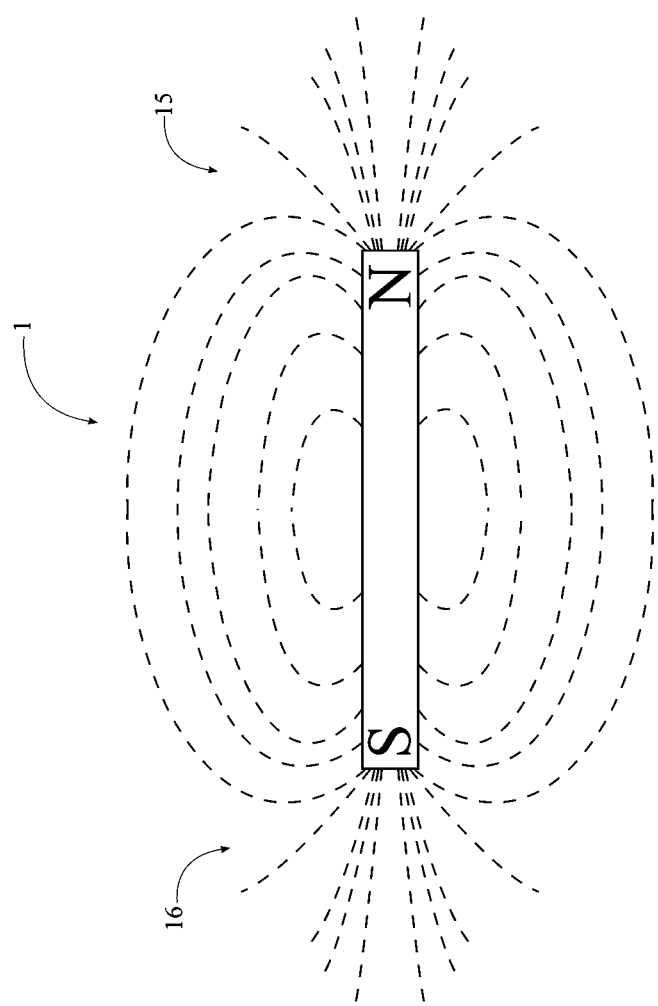
FIG. 12 is a perspective view of the electromagnetic Gauss field generated by one of the plurality of coil assemblies of the present invention, wherein the at least one rod includes a single rods.
Figure 13:
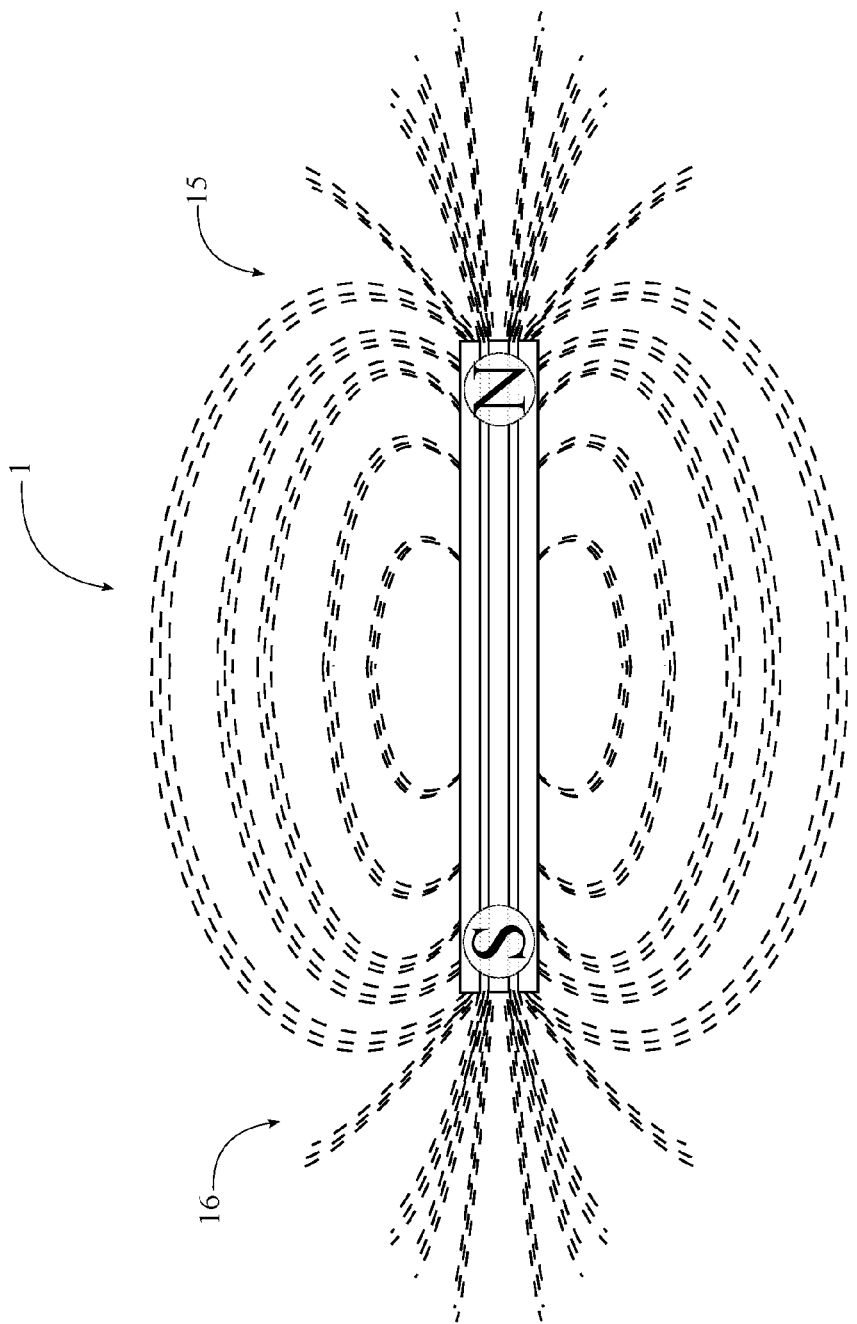
FIG. 13 is a perspective view of the electromagnetic Gauss field generated by one of the plurality of coil assemblies of the present invention, wherein the at least one rod includes three rods.
Figure 14:
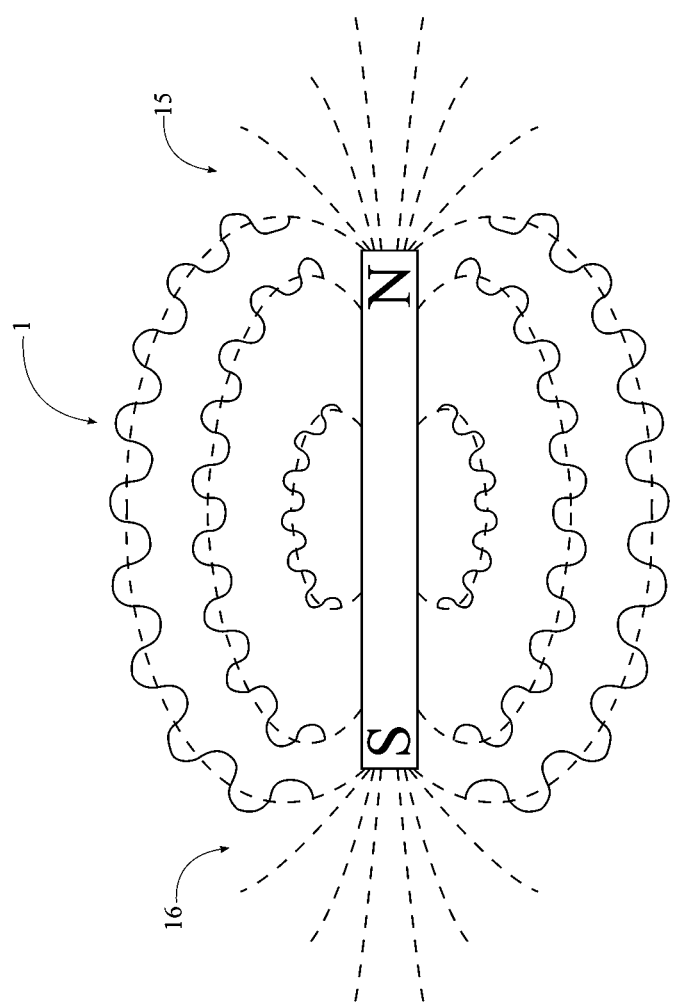
FIG. 14 is a perspective view of the electromagnetic Gauss field and the electrical frequency generated by one of the plurality of coil assemblies of the present invention, wherein the at least one rod includes a single rods.
Figure 15:
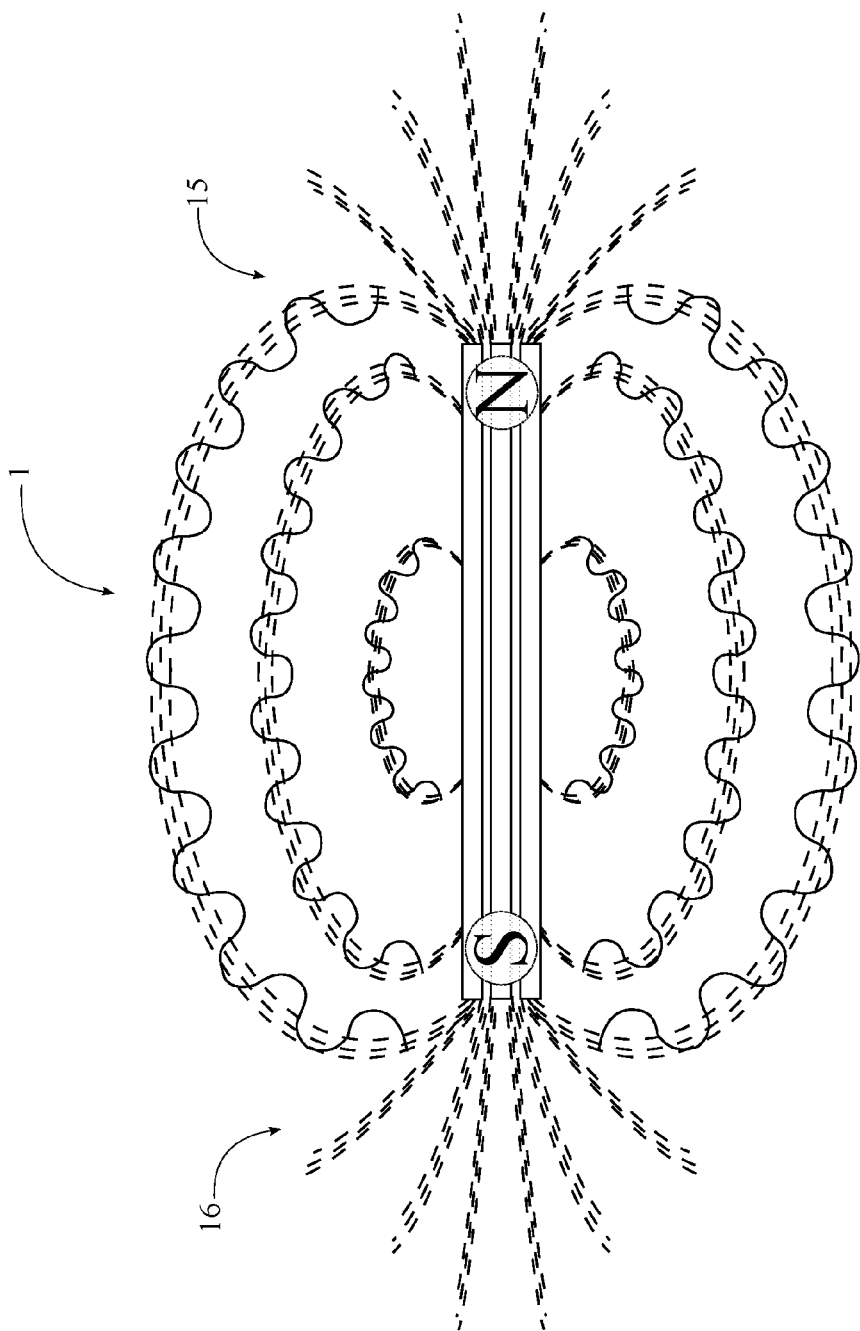
FIG. 15 is a perspective view of the electromagnetic Gauss field and the electrical frequency generated by one of the plurality of coil assemblies of the present invention, wherein the at least one rod includes three rods.
Figure 16:
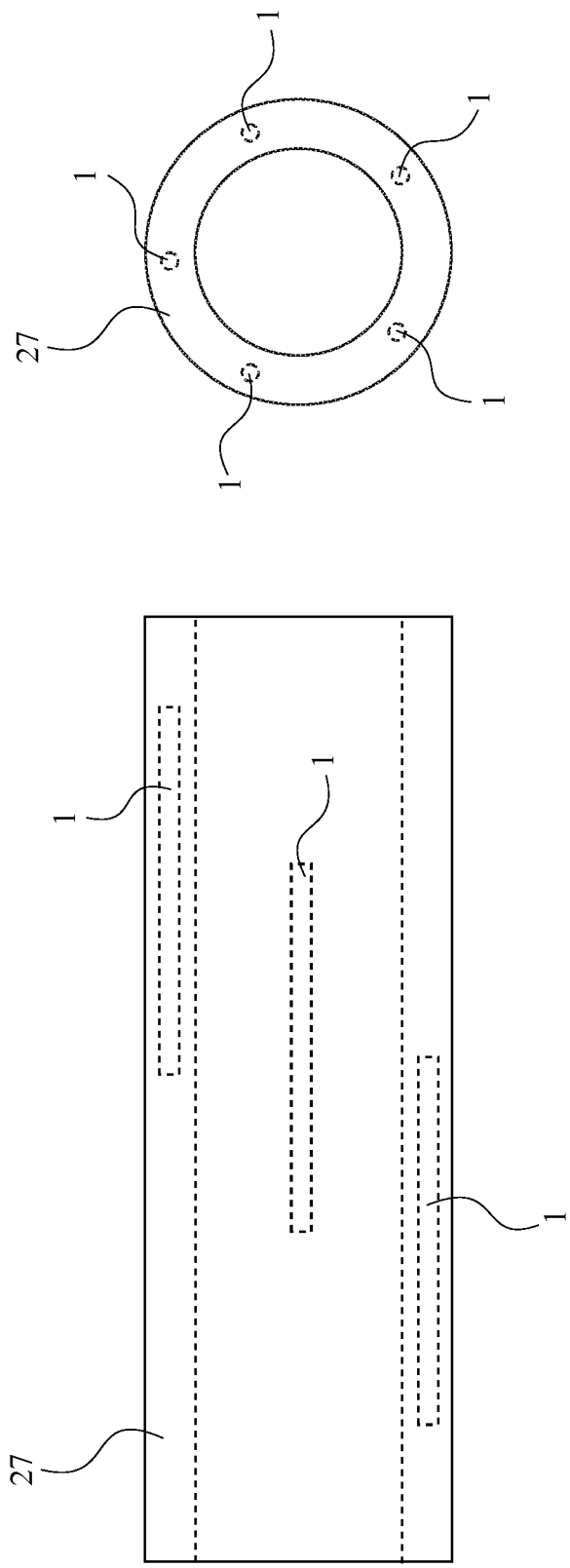
FIG. 16 is a side view of the plurality of coil assemblies wrapped in a counter clockwise (may also be clockwise) direction within the circular pipe of the present invention.
Figure 17:
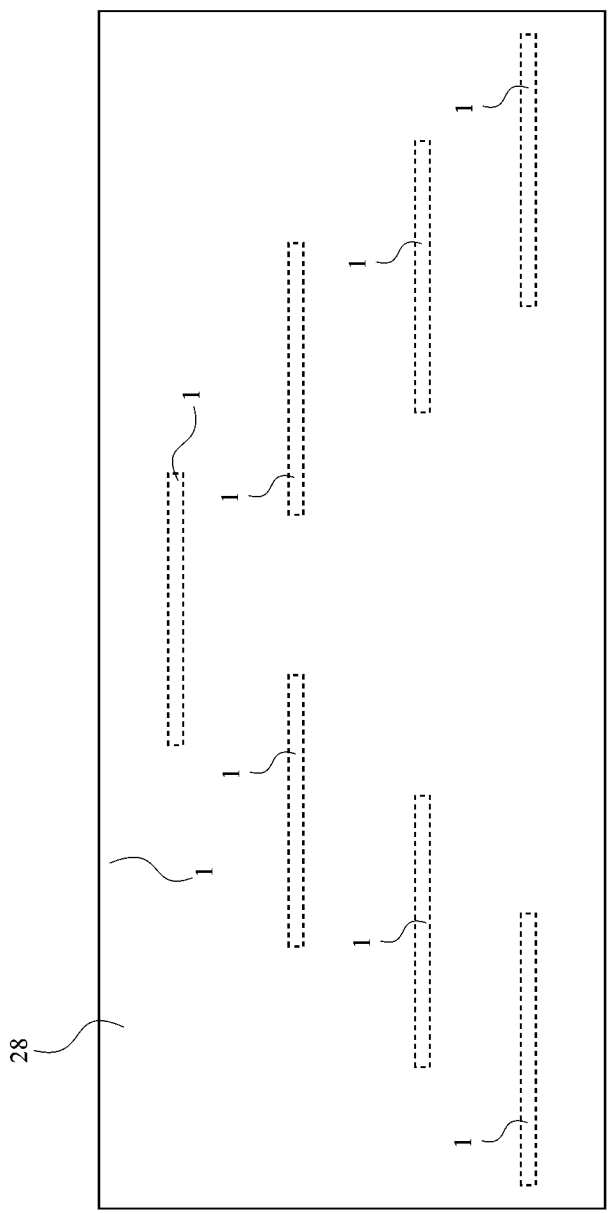
FIG. 17 is a side view of the plurality of coil assemblies positioned in an undulated direction within the flat plate of the present invention.

In an alternative embodiment of the present invention which is shown in FIG. 7, FIG. 8, and FIG. 9, the at least one rod 2 comprises three rods as the three rods and the wire wrap 9 create each coil assembly 1. The three rods are assembled together in a triangular shape with the top wire end 17 and the bottom wire end 18 terminating on the same end, preferably the top end 3 of the at least one rod 2. In reference to each coil assembly 1, the wire wrap 9 comprises a first wire section 11, a second wire section 12, a third wire section 13, and a final wire section 14; the three rods comprises a first rod 6, a second rod 7, and a third rod 8. More specifically, the first wire section 11 is coiled around the first rod 6 while being electrically connected with the bottom wire end 18. The second wire section 12 is coiled around the second rod 7 and electrically connected with the first wire section 11. The third wire section 13 is coiled around the third rod 8 and electrically connected with the second wire section 12. The final wire section 14 is externally rolled around the three rods that have been assembled in the triangular shape serving to hold the triangle shaped together. The final wire section 14 is electrically connected between the third wire section 13 and the top wire end 17. Additionally, the top wire end 17 and the bottom wire end 18 for the first coil assembly 19, the at least one intermediate coil assembly 20, and the last coil assembly 21, must have the same orientation so that the plurality of coil assemblies 1 can be electrically connected with the DC power supply 22 as shown in FIG. 4 and FIG. 5. For clarification, the wire wrap 9 should be ending on the same end, preferably the top end 3, of the three rods. The bottom wire end 18 of the first coil assembly 19 is electrically connected to the positive line 24 of the DC power supply 22. In reference to FIGS. 10 and 11, the top wire end 17 of the first coil assembly 19 is electrically connected to the bottom wire end 18 of the at least one intermediate coil assembly 20. The top wire end 17 of the at least one intermediate coil assembly 20 is electrically connected to the bottom wire end 18 of the last coil assembly 21. The top wire end 17 of the last coil assembly 21 is electrically connected to the negative line 23 of the DC power supply 22. This aspect of the present invention may then be staggered within the circular pipe 27 in a clockwise or counter clockwise direction or internally positioned in an undulating manner to each other along the length of the flat plate 28 depending upon the result desired. This configuration creates an intense multi-vibrational field.

In another alternative embodiment of the present invention, a method for generating a multi-vibrational electrical frequency with the electromagnetic field comprises of a moving DC current through the plurality of coil assemblies 1. Each coil assembly 1 is disposed substantially parallel while being staggered within the circular pipe 27 in a clockwise or counter clockwise direction to each other or internally positioned in an undulating manner to each other along the length of the flat plate 28 depending upon the result desired.

In another alternative embodiment of the present invention, which comprises a moving DC current, the plurality of coil assemblies 1 is disposed substantially parallel to each other while being staggered within the circular pipe 27 in a clockwise or counter clockwise direction or internally positioned in an undulating manner to each other along the length of the flat plate 28. Additionally, a first half of each coil assembly 1, the south pole of the respective coil assembly 1, faces toward the water flow and a second half of each coil assembly 1, the north pole of the respective coil assembly 1, faces away the from the water flow.

Figure 18:
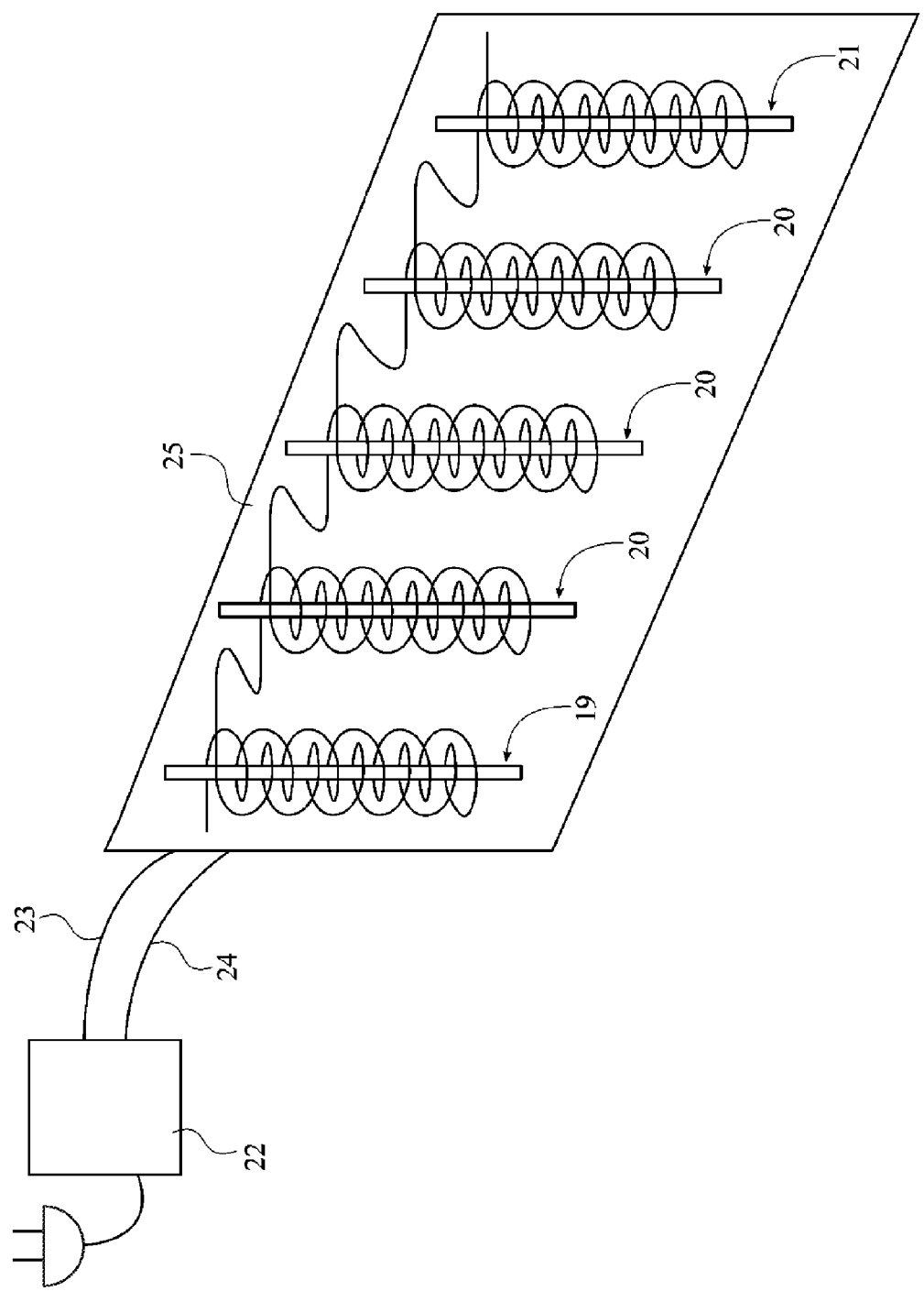
FIG. 18 is a perspective view of the present invention with various crystals either synthetic or natural, of varying shapes and sizes, coated to the perimeter of the plurality of coil assemblies.

In another alternative embodiment of the present invention that is shown in FIG. 18, a moving DC current is amplified with the crystal coating 5 that is coated around the plurality of coil assemblies 1. The plurality of coil assemblies 1 is disposed substantially parallel to each other while being staggered within the circular pipe 27 in a clockwise or counter clockwise direction or internally positioned in an undulating manner to each other along the length of the flat plate 28. In reference to FIG. 12-15, a first half of each coil assembly 1, the south pole of the respective coil assembly 1, faces toward the water flow and a second half of each coil assembly 1, the north pole of the respective coil assembly 1, faces away the from the water flow.

Figure 19:
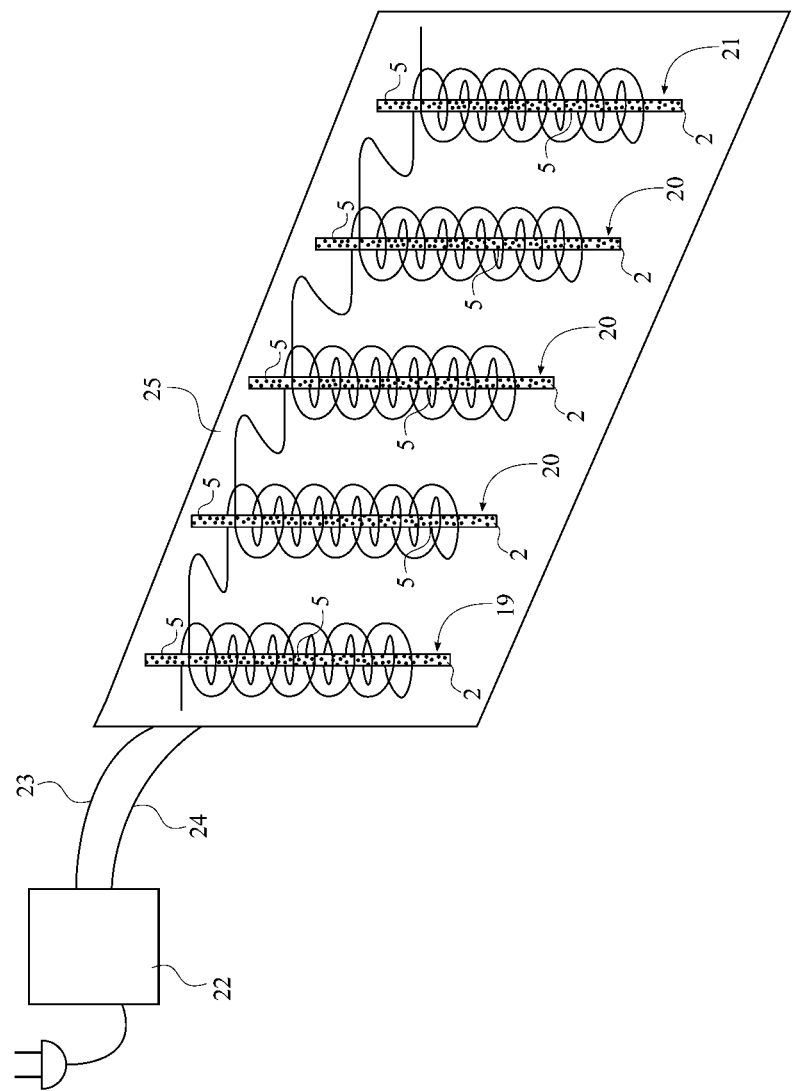
FIG. 19 is a perspective view of the present invention with various crystals either synthetic or natural, of varying shapes and sizes, coated to the perimeter of the at least one rod.

In another alternative embodiment of the present invention that is shown in FIG. 19, a moving DC current is amplified with the crystal coating 5 that is coated around the at least one rod 2. The plurality of coil assemblies 1 is disposed substantially parallel to each other while being staggered within the circular pipe 27 in a clockwise or counter clockwise direction or internally positioned in an undulating manner to each other along the length of the flat plate 28. In reference to FIG. 12-15, a first half of each coil assembly 1, the south pole of the respective coil assembly 1, faces toward the water flow and a second half of each coil assembly 1, the north pole of the respective coil assembly 1, faces away the from the water flow.

Figure 20:
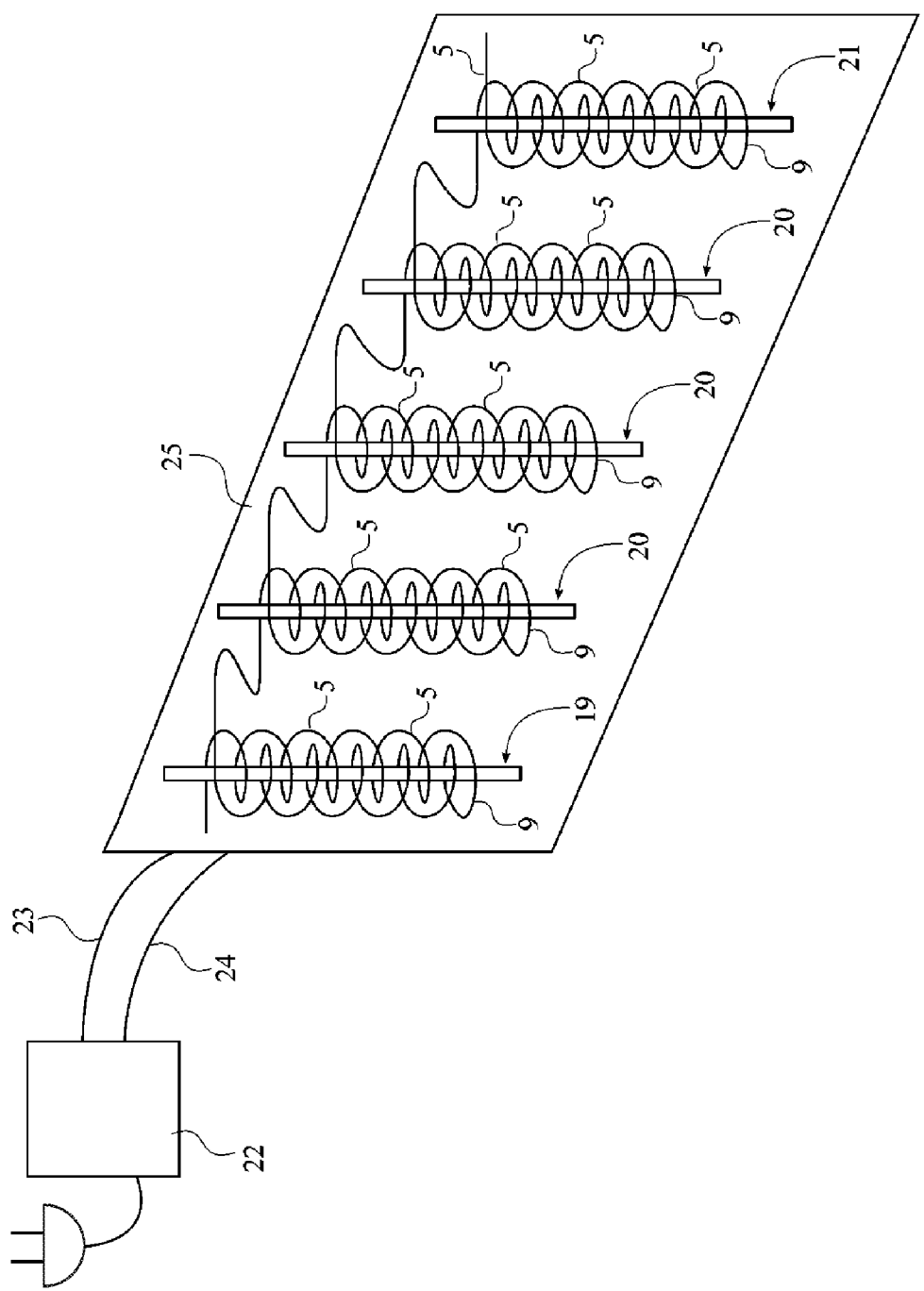
FIG. 20 is a perspective view of the present invention with various crystals either synthetic or natural, of varying shapes and sizes, coated to the perimeter of the wire wrap.

In another alternative embodiment of the present invention that is shown in FIG. 20, a moving DC current is amplified with the crystal coating 5 that is coated around the wire wrap 9. The plurality of coil assemblies 1 is disposed substantially parallel to each other while being staggered within the circular pipe 27 in a clockwise or counter clockwise direction or internally positioned in an undulating manner to each other along the length of the flat plate 28. In reference to FIGS. 12-15, a first half of each coil assembly 1, the south pole of the respective coil assembly 1, faces toward the water flow and a second half of each coil assembly 1, the north pole of the respective coil assembly 1, faces away the from the water flow.

In another alternative embodiment of the present invention, multi-vibrational fields are generated from the at least one rod 2 as the at least one rod 2 includes a plurality of spaced apart elongated rods with opposing ends. Each of the elongated rod is totally covered with a nonconductive coating while the wire wrap 9 is coiled around each elongated rods, forming the plurality of coil assemblies 1 that is connected in a staggered or undulated sequence to the DC power supply 22. The flexible epoxy coating 25 also encloses the plurality of coil assemblies 1 to maintain the positioning of the plurality of coil assemblies 1 within the flexible epoxy coating 25.

The at least one rod 2 should be cut to the appropriate length for a particular application (depending on size of the circular pipe 27 or the flat plate 28). The appropriate length and diameter of the at least one rod 2 may vary with its intended application and may be measured from about 2 inches to about 24 inches in length, preferably from about 4 inches to about 10 inches. The at least one rod 2 may have a diameter that may vary with its intended application and may be measured from about 1/16 inch to about 1 inch, preferably about 1/8 inch to about 1/2 inch. The at least one rod 2 may be made from a specialized metal including, but not limited to, a rare earth metal, a plastic encasement holding a magnetic conductive material, and any other conductive metal such as cold rolled steel.

Figure 1:
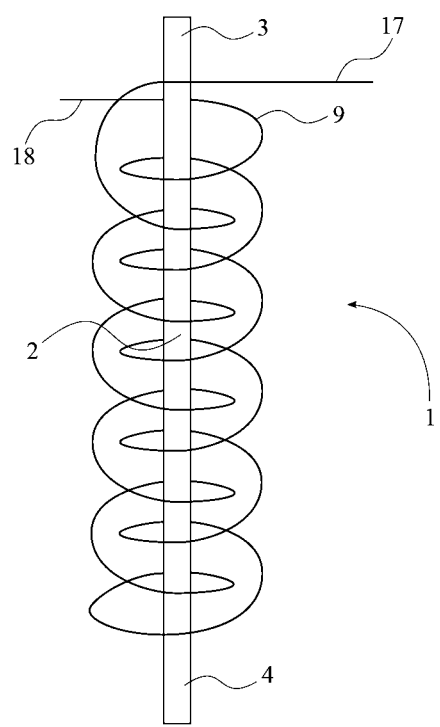
FIG. 1 is a side view of one of the plurality of coil assemblies of the present invention.

Referring to FIG. 1, the wire wrap 9 that also includes the top wire end 17 and the bottom wire end 18 is a conducting wire, such as a copper, gold, silver, magnetic wire, or any other conductive metal. The wire wrap 9 is coiled and wrapped around the at least one rod 2 from the top end 3 to a bottom end 4 of the at least one rod 2 and back up to the top end 3. More specifically, the wire wrap 9 should coil from the top end 3 of the at least one rod 2 leaving a small amount, approximately 1/4 inch exposed or extended, to define the top wire end 17 and the bottom wire end 18. The wire wrap 9 may be doubled back on itself when reaching the bottom end 4 of the at least one rod 2, the opposite end of the top end 3, a number of times depending upon the penetration depth needed for a particular application. The wire wrap 9 size may vary within the present invention depending upon the frequency and the depth on the penetration needed for the application. The wire wrap 9 is preferably sized between about 36 gauges to about 10 gauges. Typically the wire wrap 9 can be sized from about 28 gauges to about 18 gauges. The at least one rod 2 may be wrapped with wire wrap 9, as described above. The at least one rod 2 may be laid out substantially staggered or undulated in a progressive fashion to each other or the at least one rod 2 may be bundled in groups of two, three, or more with the final wire section 14 wrapped around the bundled group. The final wire section 14 can be configured as a single wrap or multiple wraps. These bundled groups should be staggered or undulated in a similar spiraling fashion within the circular pipe 27 in a clockwise or counter clockwise direction or internally positioned in an undulating manner to each other along the length of the flat plate 28. Typically, between 3 and 30 rods 2 may be used, but more or less may be needed depending on the application. Preferably between 5 and 20 rods 2 are used within the typical configuration of the present invention. The spacing between the rods 2 may be, but not limited to, between 1/4 inch and about 2 inches. The number of rods 2, the wire wraps 9 on the rods 2, and the spacing between the rods 2 may be a function of the intended use of the present invention. For example, calcium carbonate control applications may vary depending upon the size of the circular pipe 27 and the speed of the liquid flow. Also affecting the distance between each rod 2 is the contents within the liquid flowing in and around the circular pipe 27. The voltage and amperage of the DC power supply 22 may affect the spacing between each rod 2; however, the DC power supply 22 generally outputs 3 to 40 voltage at 1 to 10 amperage. For example, spacing for normal water treatment is approximately 1.5 inches at 6 voltage with 1.75 amperage. This can vary with the number of inches of the wire wrap 9 used around the at least one rod 2.

The housing 26, the circular pipe 27 or the flat plate 28, can be made from plastic, copper, or stainless steel only since steel pipe can dissipate the effectiveness of the water treatment. Once the liquid is treated through the present invention, then the clean liquid may travel through a steel pipe unaffected.

The present invention can be installed within the circular pipe 27 or the flat plate 28 of the intended liquid it is intended to treat. For the treatment of very large flows of liquid, such as water canals of electrical generating plants, the present invention is submerged into the water canals in a fashion so the magnetic field creates an even energy field throughout the liquid being treated.

The present invention can also be installed within the return pipe of a cooling tower between the return pipe and the supply pipe of the cooling tower. This being a closed loop system and a small amount of water is designed to be treated from the supply pipe to the return pipe, the present invention is able to effectively clean a significant amount of water of the cooling tower system.

The present invention has a major role in controlling the calcium, scale, bacteria, algae removal and buildup in industrial cooling towers. Bacteria counts have been commonly measured at below 400 cfu/ml. Many cooling towers that uses chemical treatment only be able to achieve one to three cycles before new water must be introduced into the system. A major savings in water usage with a count of ten or more cycles is easily achieved by utilizing the present invention, resulting in millions of gallons of water saved. As a result, the total use of chemical treatment in cooling towers can be eliminated from the treatment process.

The treatment of water in cooling towers or other bodies of water in a contained circulating system may be achieved by treating the complete flow of the liquid or by using only a side slip method treating only a small portion at a time. It has shown through bacteria counts (under 400 cfu/ml) that the whole system is affected. It is also observed that scale and calcium build up disappeared (in less than 30 days) with a sideslip as fast as it did when the total amount of water traveling through the circulating system is treated with the present invention.

The present invention may be used to control calcium and mineral buildup in cooling towers boilers, chillers, evaporate coolers, plumbing fixtures and other equipment without chemical use.

The present invention may also reduce the amount of soap for laundry from about 1 cup to about 1/8 cup. The cleaning time in areas of normal mineral buildup may be drastically reduced.

Water softener salt reduction may be achieved by utilizing the present invention before it enters the softener. The salt settings may then be reduced by about 50% or more. Field testing has shown a 70% reduction in salt usage while maintaining 0 to 4 grains of water hardness.

By utilizing the present invention along with a circulating line of a swimming pool, chlorine usage is reduced by 66% while still maintaining the required standard chlorine levels. New calcium scale build-up is prevented, water clarity is improved and algae growth is inhibited.

While not relying on any single mode of operation of the present invention, the vibrating magnetic resonating frequency vortexing field apparatus may use frequencies superimposed on a magnetic field to restructure chemicals, minerals and water molecules. The structuring of the liquid becomes stable with an observed shelf life in excess of four months before changes occur. The transferring of the structured liquid through a steel or galvanized pipe seems to have no effect on the structuring of the liquid.

Through the use of a magnetic field, the molecules may not only align but also break into smaller grouping causing a change in the surface tension of the liquid. The present invention may use a pulsing electrical frequency superimposed or combined with a magnetic field to align the molecules in a uniform or scattered directional field. With the physical changing of calcium carbonate to calcium bicarbonate the saturation point becomes over 10,000 times to one higher. The calcium bicarbonate in the water may retain its solvency as long as a liquid form is maintained and may not allow minerals to revert back to form a hard crystal scale. The electromagnetic field generated by the present invention may move with the vortex flow of the water, aligning the molecules and changing the calcium of the complete liquid. By treating the water and the calcium, the water may cause a reaction with the bacteria and algae causing a die off effect of them. This treatment process does not allow the calcium to bond in pipes, on fixtures, in water heaters, or on glass or tile.

EXAMPLES

Example 1

A water boiling and steam temperature test was conducted. Identical glass pots, water source and amount of water were used. The stove is new and the heating elements are the same size. The temperature of the city water at a full boil was 210 degrees Fahrenheit. The temperature of the treated city water was 180 degrees Fahrenheit at a full boil. All conditions being equal, at a full boil the steam of the treated water was 10 degrees hotter than the city untreated water steam. The treated water created hotter steam; however the untreated city water boiled away twice as fast as the treated water. The test was repeated swapping pans and heating elements with the same results as previously observed.

Example 2

Examples of industrial use in cooling towers shows a small Imeco cooling tower tied to a closed loop refrigeration system blowing down at one and one half cycles was using in excess of 22,000 gallons of water per year. At this setting a scale of approximately ½ inch thick on the bottom of the tower was observed even with the use of chemicals in the tower. The fill had a visible amount of calcium buildup on it. Then the present invention was installed, all chemicals removed, and the cycle setting set to fifteen. After one month, all of the buildup on both the bottom and fill disappeared. Also the bacteria count was reduced to less than 100 colony-forming units per milliliter (cfu/ml) as tested by an outside-certified lab. This is less than ¹/₁₀₀ of the Cooling Tower Institute maximum recommendation of 10,000 cfu/ml. After six months of operation and monthly bacteria test, the tower is still clean and bacteria counts are still minimal with no additional maintenance required. The water is clear, with no odor, no algae, no scale, a pH of 8.9 and the conductivity set at 2010. A water savings of 1,808,000 gallons per year was achieved. A savings of $12,423.00/year total savings was achieved.

Example 3

Examples of industrial use in cooling towers shows two BAC cooling towers tied to two Trane 125 Ton Chillers, blowing down at 2.3 cycles, using in excess of 4,000,000 gallons of water per year. At this setting a heavy scale on both the bottom and sides of the tower and on the fill was observed even with the use of chemicals in the tower.

Various plants and algae were growing on both the sides and on the top of the tower. Visible deterioration of metal components was evident due to the use of chemicals. Then the present invention was installed, all chemicals removed, and the cycle setting adjusted from 2.3 to 5. After one month, all scale and algae build up on both the bottom, sides and fill disappeared. The bacteria count was reduced to less than 100 colony-forming units per milliliter (cfu/ml) as tested by an outside certified lab. This is less than ¹/₁₀₀ of the acceptable Cooling Tower Institute maximum recommendation of 10,000 cfu/ml. After six months of operation and monthly bacteria test, the tower is still clean and bacteria counts are still minimal with no additional maintenance required. The water is clear, with no odor, no algae, no scale, a pH of 8.9 and the conductivity set at 2010. The present invention is able to eliminate the usage of 1,195,000 gallons per year and created a savings of $10,211.00 per year in water cost.

Example 4

A significant difference in plant growth was observed in a 16-day test. Two 25 gallon planting tubs were filled with garden soil. An 8 pack of tomato plants were split between the two tubs. One tub was watered with city water and the other tub was watered using the same city water, only treated with the present invention. A notable difference in height, number of branches, leaves and color was observed after 4 days. Photos were taken every two days. After 16 days the test was stopped because the plants being watered with untreated city water were failing to thrive. The plants getting treated city water, using the apparatus were flourishing, with many blooms and very small tomatoes in about two weeks' time.

Example 5

A test with a large PORTA COOL evaporative cooler was conducted in the month of June of 2010, with a humidity of approximately 60%. Testing of the untreated incoming city water showed a measurement of 565 microsiemens. Using this untreated city water at 565 microsiemens, the scale buildup began at 750 microsiemens which is 1 and ½ cycles. The present invention was then attached to the line feeding the fill material inside the unit. When treatment was started the scale buildup disappeared. For further testing, pieces of copper, steel, iron, rusty nails and plastic were placed in the bottom of the PORTA COOL. As the microsiemens steadily increased, there was no noticeable change or deterioration in any of the products with the exception of the rusty nails. These nails became shiny and looked almost new. The microsiemen count increased after one week to 25,000 with no buildup of scale observed. At 25,000 microsiemens, with the ambient temperature in the high 80's (F), the water temperature in the PORTA COOL was in the low 50's (F). In addition, the incoming air and outgoing air differential was in excess of 25 degrees F. with an appreciable difference in humidity, creating a very cool feeling to anyone standing in the outgoing airflow. This unit is able to cool a double car garage that has no insulation and is always very hot and humid during the months of June and July.

Example 6

Leaf lettuce was purchased from a local grocery store. One half was washed in city water, drained and placed in a plastic container with the lettuce standing upright to allow for drainage. The other half was handled the same except it was washed in treated city water, using the apparatus. Both containers were placed in the refrigerator with a paper towel in the bottom to absorb the excess water. After four days the untreated lettuce began to wilt and the edges of the lettuce were starting to turn brown. The treated lettuce still had very small water droplets attached to the surface of the leaves and the lettuce actually appeared greener and fresher than it had at the time of purchase. After four months the treated lettuce was removed from the refrigerator, it was still crisp with droplets still on the surface of the leaves. There was no wilting or discoloration. The lettuce still tasted crunchy and fresh.

Example 7

An outdoor swimming pool was left unattended over the winter in 2010 in West Virginia. In May of 2010, it was murky and green with a ring of white on the edge of the pool at the top of the water level and there were brown spots on the bottom. The circulating pump was turned on and the present invention was placed on the circulating water line after the pump. The pool had a bag filter in the system, and a new bag was placed in the filter. After four days and many, bag cleanings, the pool was crystal clear. Even the brown spots in the bottom were gone. The white hard water calcium around the water level edge wiped off easily with a sponge. The water tested fine with a completely negative bacteria count on the tests that we ran. This same test was repeated by an outside-certified lab to verify our results. The pool maintained clarity and bacteria growth control through the summer with minimal care. Two families including a number of children used the pool.

Example 8

A residential house with a city water hardness of 60 grains, installed the present invention on the incoming water line. This residence also had a water softener. At that time the salt setting on the water softener was reduced by 75%. The homeowner claimed the water felt softer after adding the apparatus and reducing the salt by 75%. He also noticed a further reduction in soap use and scum and scale build up on the showerheads and faucets.

Example 9

A coil on a steel rod was used to create a magnetic field for the use of helping to separate a water molecule using electrolysis. While one coil showed a change the present invention on a re-circulating loop with the electrolyte passing through it made a much greater change in the amount of gas produced.

Although the invention has been explained in relation to its preferred embodiment, it is to be understood that many other possible modifications and variations can be made without departing from the spirit and scope of the invention as hereinafter claimed.

What is claimed is:
1. An apparatus for creating a vortex system comprises:
a plurality of coil assemblies;
a Direct Current (DC) power supply;
a flexible epoxy coating;
a housing;
each of the plurality of coil assemblies comprises at least one rod and a wire wrap;
the at least one rod comprises a top end and a bottom end;
the wire wrap comprises a top wire end and a bottom wire end;
the DC power supply comprises a negative line and a positive line;
the wire wrap comprising a wire being coiled and wrapped around the at least one rod from the top end to the bottom end and back up to the top end;
the top wire end and the bottom wire end being extended from the top end;
the plurality of coil assemblies being enveloped by the flexible epoxy coating;
the plurality of coil assemblies being arranged in parallel relationship to each other along the housing;
the plurality of coil assemblies being encased within the housing; and
the plurality of coil assemblies being electrically connected with the DC power supply through the negative line and the positive line;
the plurality of coil assemblies further comprises a first coil assembly, at least one intermediate coil assembly, and a last coil assembly;
the bottom wire end of the first coil assembly being electrically connected to the positive line;
the top wire end of the first coil assembly being electrically connected to the bottom wire end of the at least one intermediate coil assembly;
the top wire end of the at least one intermediate coil assembly being electrically connected to the bottom wire end of the last coil assembly;
the top wire end of the last coil assembly being electrically connected with the negative line;
the at least one rod being coated with a crystal coating, wherein the crystal coating may be natural or synthetic crystals of various sizes and causes an increase in the magnetic high frequency fields; and
the at least one rod having a length from 4 inches to 10 inches and having a diameter from ⅛ inch to ½ inch.
2. The apparatus for creating a vortex system as claimed in claim 1, wherein the wire wrap is covered with a non-conductive coating.
3. The apparatus for creating a vortex system as claimed in claim 1 comprises:
the housing being a circular pipe; and
the plurality of coil assemblies being arranged in parallel relationship to each other in staggered positioning.
4. The apparatus for creating a vortex system as claimed in claim 1 comprises:
the housing being a flat plate; and the plurality of coil assemblies being arranged in parallel relationship to each other in undulated positioning.

5. The apparatus for creating a vortex system as claimed in claim 1, wherein structurally changing water molecule groupings, and causing the water molecule groupings to alter the surface tension of the water.

6. The apparatus for creating a vortex system as claimed in claim 1, wherein calcium carbonate in water flowing adjacent to the housing to be chemically altered to become calcium bicarbonate.

7. The apparatus for creating a vortex system as claimed in claim 1, wherein the wire wrap being made from a material selected from the group consisting of copper, silver, and gold.

8. The apparatus for creating a vortex system as claimed in claim 1, wherein the DC power supply outputs 3 to 40 volts at 1 to 10 amps.

\* \* \* \* \*